(12) United States Patent
Cifers et al.

(10) Patent No.: US 12,161,102 B1
(45) Date of Patent: *Dec. 10, 2024

(54) ROD HOLDER

(71) Applicant: YakAttack, LLC, Farmville, VA (US)

(72) Inventors: Luther Cifers, Farmville, VA (US); Daniel Anderson Newman, Salem, VA (US)

(73) Assignee: YakAttack, LLC, Farmville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,936

(22) Filed: Jun. 18, 2021

Related U.S. Application Data

(63) Continuation of application No. 16/032,036, filed on Jul. 10, 2018, now Pat. No. 11,051,502.

(60) Provisional application No. 62/530,434, filed on Jul. 10, 2017.

(51) Int. Cl.
*A01K 97/10* (2006.01)
*F16B 2/10* (2006.01)

(52) U.S. Cl.
CPC ............... *A01K 97/10* (2013.01); *F16B 2/10* (2013.01)

(58) Field of Classification Search
CPC ...................................... A01K 97/10
USPC ........................................... 43/21.2
See application file for complete search history.

(56) References Cited

U.S. PATENT DOCUMENTS

| | | | |
|---|---|---|---|
| 4,198,775 A | 4/1980 | Leisner | |
| 4,827,654 A * | 5/1989 | Roberts | A01K 97/10 |
| | | | 248/514 |
| 5,231,785 A | 8/1993 | Roberts | |
| 5,313,734 A * | 5/1994 | Roberts | A01K 97/10 |
| | | | 248/514 |
| 6,302,367 B1 | 10/2001 | Ratza et al. | |
| 6,357,166 B1 * | 3/2002 | Malmanger | A01K 97/10 |
| | | | 43/21.2 |
| 7,849,630 B2 * | 12/2010 | Carnevali | A01K 97/10 |
| | | | 43/21.2 |
| 8,024,886 B2 * | 9/2011 | Sutherland | A01K 97/10 |
| | | | 248/514 |
| 8,156,681 B2 * | 4/2012 | Carnevali | A01K 97/10 |
| | | | 43/21.2 |
| 2014/0047758 A1 | 2/2014 | Ciciulla | |

* cited by examiner

*Primary Examiner* — David J Parsley
(74) *Attorney, Agent, or Firm* — Thedford I. Hitaffer; Hitaffer & Hitaffer, PLLC

(57) ABSTRACT

A fishing rod holder for holding a fishing rod to an environmental supporting object, such as a watercraft. The fishing rod holder may include a body having a trough to receive the fishing rod, a collar rotatable to entrap the rod within the trough.

13 Claims, 5 Drawing Sheets

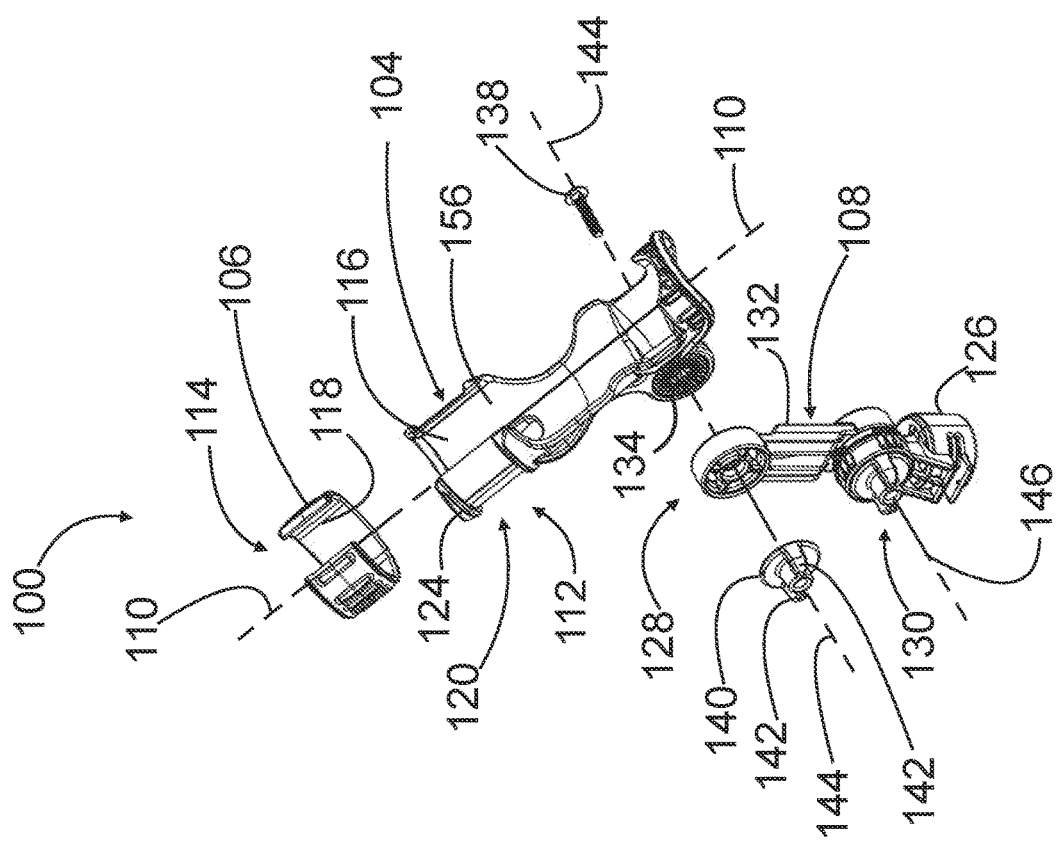
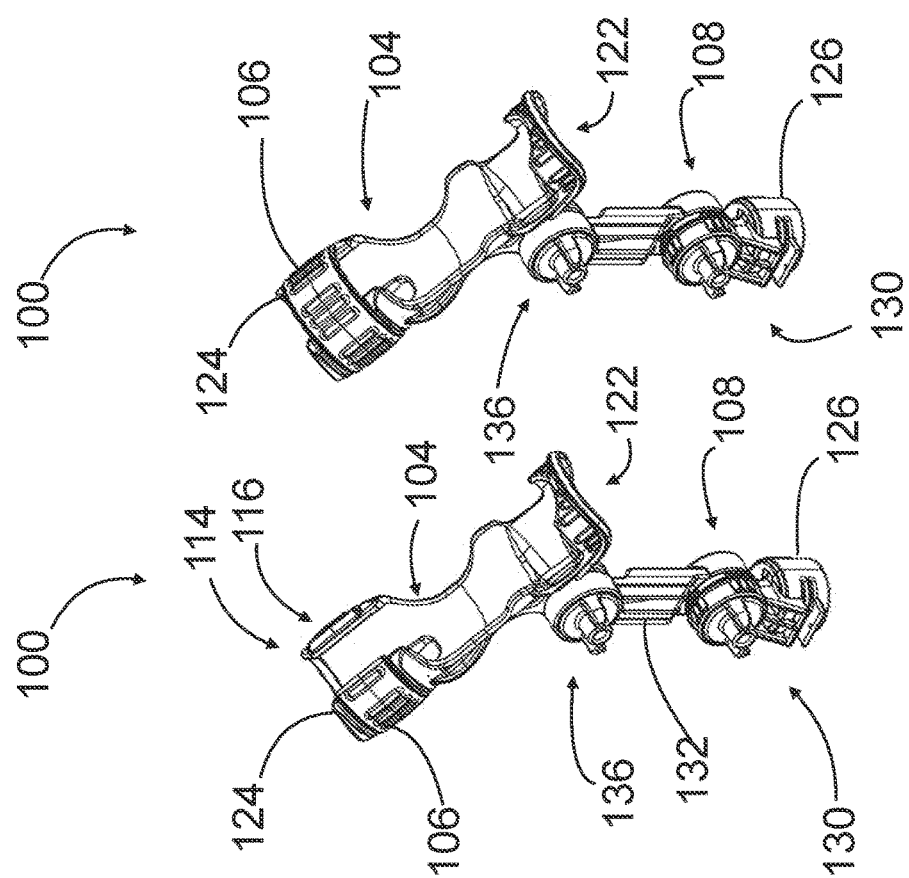
FIG 1
FIG 2
FIG 3

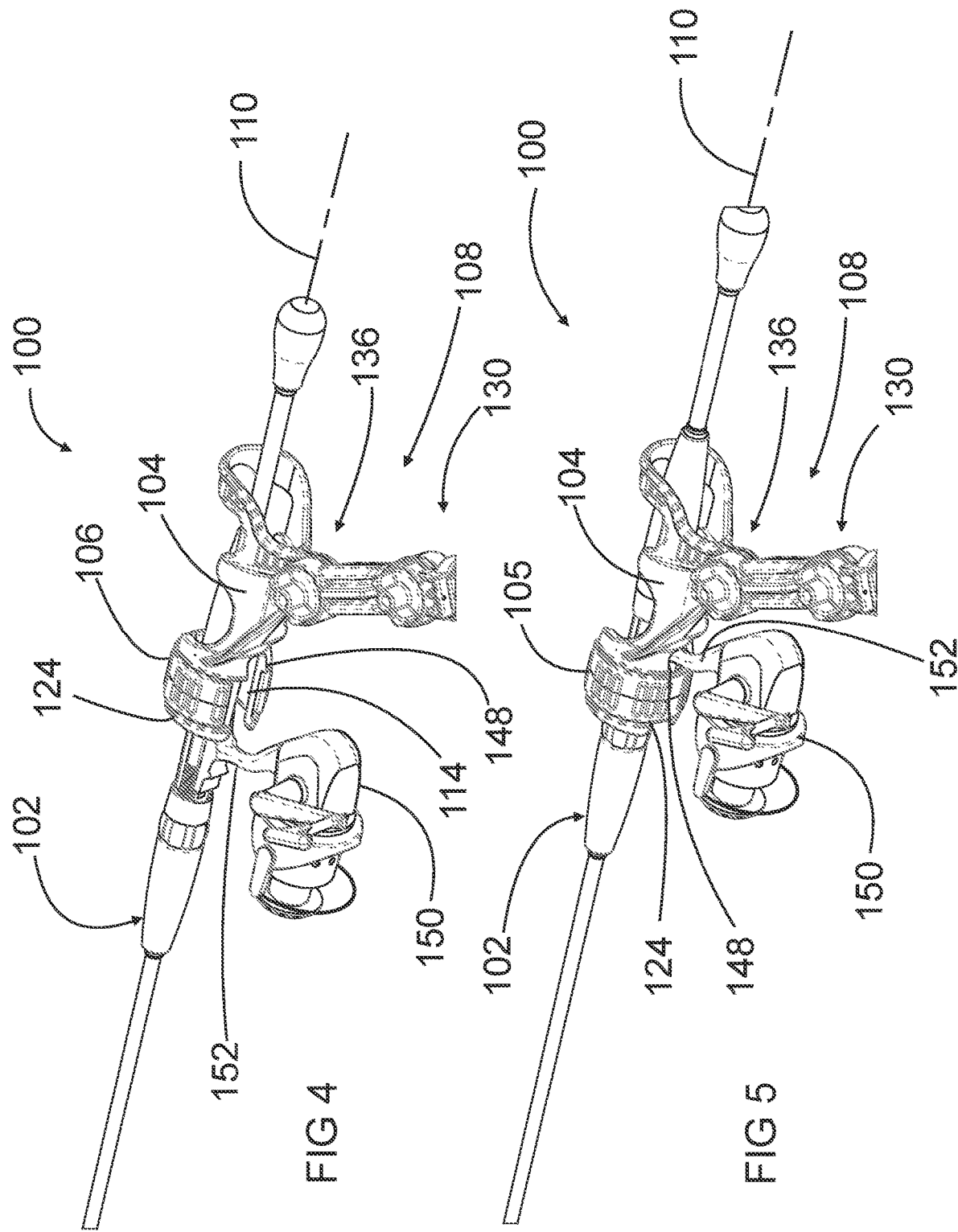

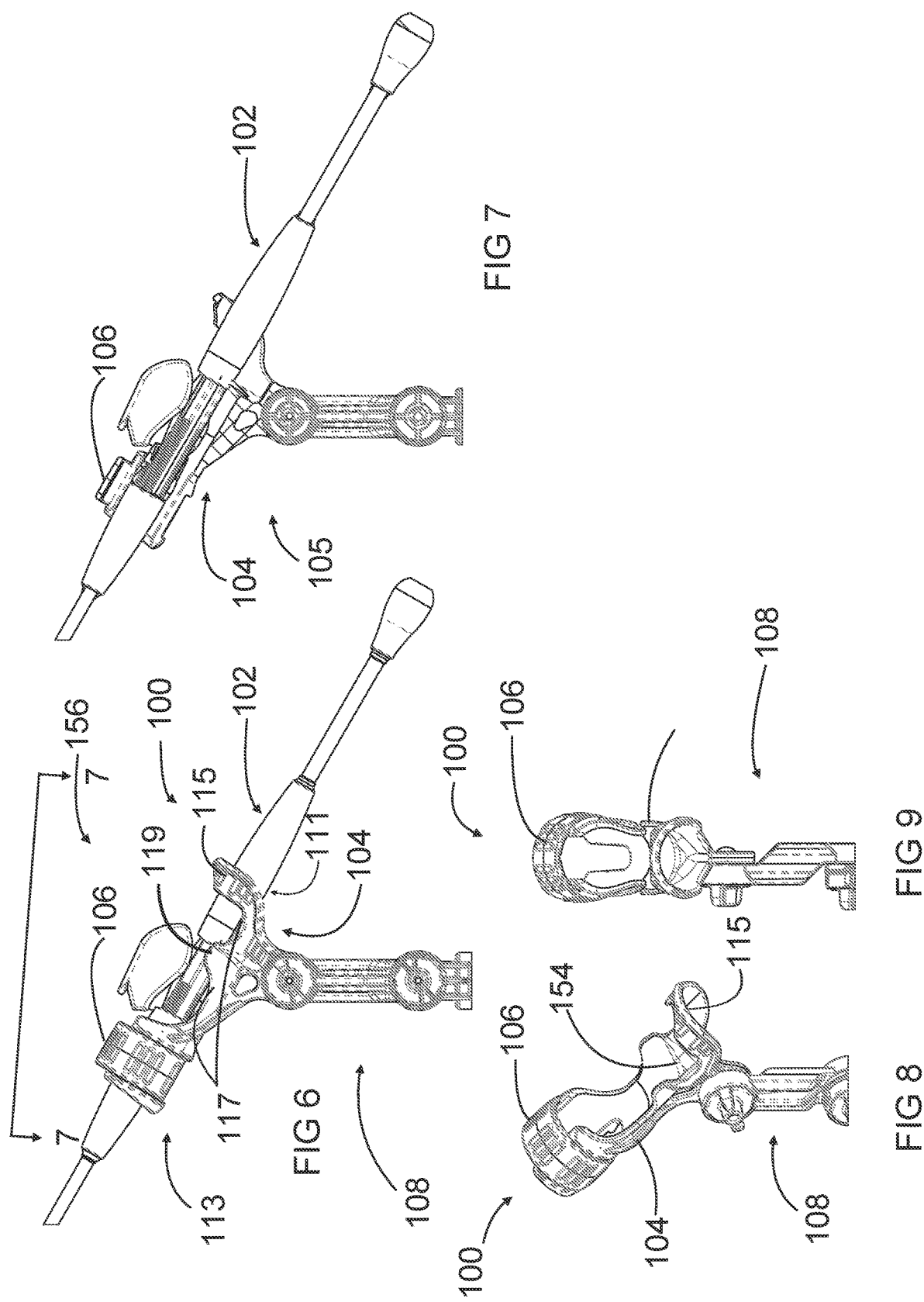

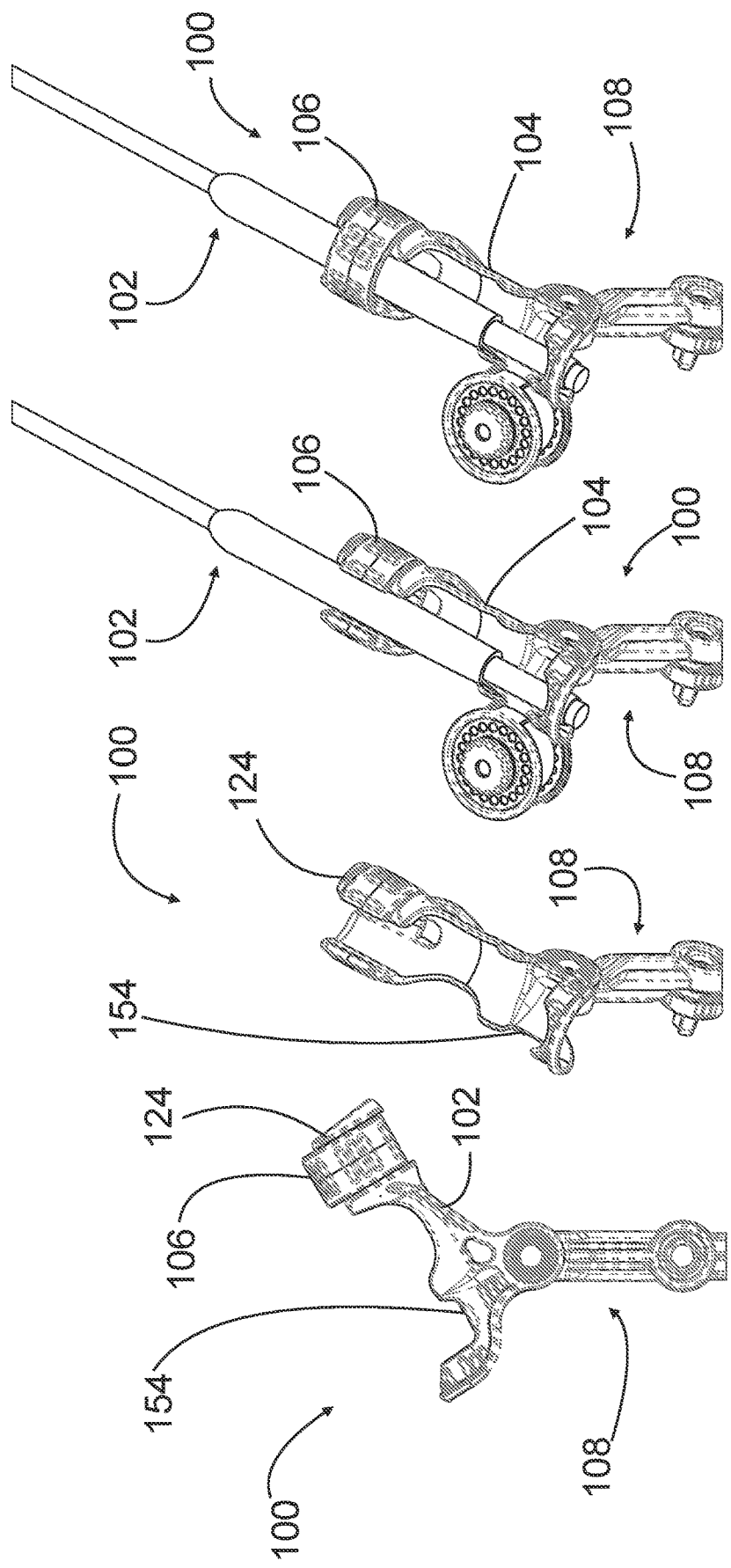

ROD HOLDER

CROSS-REFERENCE TO RELATED APPLICATION

This application is a continuation of U.S. patent application Ser. No. 16/032,036 filed Jul. 10, 2018, which claims the benefit of U.S. Provisional Application No. 62/530,434, filed Jul. 10, 2017, the disclosures of which are incorporated herein by reference in its entirety.

BACKGROUND

This present invention relates generally to fishing rods, and more particularly, to holders, supports, steadying devices for fishing rods. Most particularly, the invention relates to supports for supporting fishing poles or rods.

Fishing using fishing poles or rods frequently requires that the fishing with the same be held proximate to a body of water for a prolonged time interval. However, it is impractical for a person to hold a fishing pole or rod for extended periods of time. Moreover, poles and rods must frequently be held at a predetermined angle to a supporting surface or an environmental object. Even further, holders for poles and rods must be able to accommodate structural features of the poles or rods, such as a reel, clutch and others.

There exists a need for a fishing rod or pole holder that meets the above needs simultaneously.

SUMMARY OF THE INVENTION

The present invention addresses the above stated need by providing a rod holder, which releasably receives a fishing pole or rod, and is, in turn, attachable to an environmental supporting surface or object, such as a watercraft, and particularly suitable for use on a paddle craft, such as a kayak. A collar having a gap rotatably encircles a body of the rod holder and is rotatable between a first position entrapping the fishing rod and a second position, wherein a gap is located to release the fishing rod from entrapment. A mount enables the rod holder to be fixed to the environmental supporting object. Rotation or pivot joints enable an elevation angle of the fishing rod to be adjusted.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the rod holder will become more fully appreciated when considered in view of the accompanying drawings, in which like reference characters designate the same or similar parts and/or features throughout the several views, and wherein:

FIG. 1 is an exploded perspective view of a rod holder according to at least one aspect of the disclosure;

FIG. 2 is a perspective assembled view of the rod holder of FIG. 1;

FIG. 3 is similar to FIG. 2 but shows a retention collar rotated into a retaining position;

FIG. 4 is an environmental perspective view of the rod holder of FIG. 1, showing an initial stage of insertion of a fishing rod thereinto, wherein the fishing rod is equipped with a spinning reel;

FIG. 5 is similar to FIG. 4 but shows the fishing rod fully inserted into the rod holder with the retention collar containing the rod;

FIG. 6 is an environmental side view of the rod holder of FIG. 1, with a fishing rod equipped with a bait catcher support supported thereby;

FIG. 7 is an environmental cross-sectional view of the rod holder of FIG. 6, taken along line 7-7 of FIG. 6;

FIG. 8 is a perspective partial view of the rod holder of FIG. 1;

FIG. 9 is a rear partial view of the rod holder of FIG. 1;

FIG. 10 is a side view of the rod holder of FIG. 1;

FIG. 11 is similar to FIG. 8 but is taken from an opposed side of the rod holder;

FIG. 12 is an environmental view similar to FIG. 11, showing a fishing rod equipped with a fly reel received within but not secured to the rod holder;

FIG. 13 is similar to FIG. 12 but shows the fishing rod secured within the rod holder.

DETAILED DESCRIPTION OF THE PREFERRED EMBODIMENT

Figure 14:
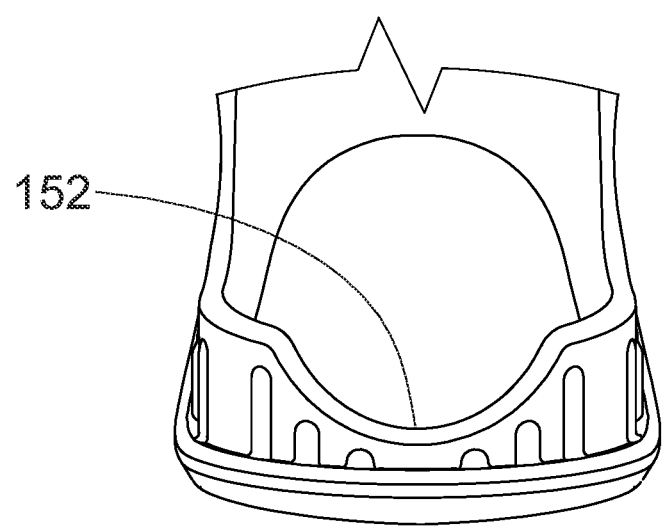
FIG. 14 is an enlarged top plan view of a rear portion of the rod holder of FIG. 1.

Referring first to FIG. 1, there is shown a rod holder 100 for holding a fishing rod 102 (shown in FIG. 4). The rod holder 100 comprises a body 104 and a rotating and indexing ring or collar 106. A mount 108 (shown in FIG. 2) may be provided to affix the rod holder 100 in relation to an environmental supporting surface or object (not shown). The body 104 receives the fishing rod 102 within a trough 156 in the body 104, along a principal or longitudinal axis 110. The collar 106 expands elastically to coaxially surround and engage a portion 112 of the body 104, or alternatively is received in the trough 156 to surround the trough 156. The illustrated trough 156 is longitudinally oriented along the longitudinal axis 110 of the body 104. Note that the collar-engaging portion 112 of the body 104 provides a recess partially encircling the longitudinal axis 110 of the body 104. The recess is configured to receive the collar 106 in close yet rotationally slidable cooperation therewith.

Referring now to FIGS. 2 and 3, the collar 106 is rotatable around the body 104, such that, in one angular position, an opening 114 of the collar 106 is aligned with a corresponding opening 116 of the body 104. In this position (shown in FIG. 2), the fishing rod 102 may be inserted laterally or transversely into the trough 156. As seen in FIG. 3, rotation of the collar 106 closes a gap that exists when openings 114 and 116 are aligned or coincident. Closing this gap entraps and surrounds the fishing rod 102. Alternatively stated, the collar 106 surrounds the trough 156. The collar 106 comprises a collar opening 114, leaving a gap enabling the fishing rod 102 to be inserted laterally or transversely therethrough into the trough 156.

The collar 106 engages the collar-engaging portion 112 of the body 104 by a detent arrangement, wherein lands 118 of the collar 106 enter and occupy corresponding grooves 120 of the body 104 to provide various selectable positions. An inner surface of the illustrated collar 106 preferably has three grooves 120, circumferentially spaced about 90 degrees apart from one another, with two such grooves 120 circumferentially spaced about 90 degrees from a radial center of the collar opening 114 and one groove 120 circumferentially spaced about 180 degrees from a circumferential center of the collar opening 114. Two lands 118 are provided in the body 104, one on each opposing side of the body 104. This arrangement of lands 118 and grooves 120 allows the collar 106 to be selectively positioned with the collar opening 114 facing upwards, downwards or to the left or right sides of the body 104.

The collar 106 is preferably dimensioned of an elastic or slightly elastic material, which enables hand or finger pressure to overcome the interaction of the lands 118 and grooves 120 so that the collar 106 may be rotated around the body 104. Engagement of the collar 106 and the body 104 opposes spontaneous mutual rotation of the collar 106 and the body 104, although rotation by hand or finger pressure is nonetheless possible.

The collar 106 entraps the fishing rod 102 after the latter has been inserted through an opening 122 and the collar 106 is rotated to close the gap that exists when openings 114 and 116 are aligned. With a relatively greater length of the fishing rod 102 projecting from an end 124 of the body 104, gravity and interference will hold the fishing rod 102 in place in the rod holder 100.

With its lateral symmetry and infinite rotation, the collar 106 accommodates left and right-handed users.

As stated above, the body 104 may be secured to an environmental supporting surface or object (not shown), for example, by the mount 108. The mount 108 may comprise a socket 126 to engage the environmental supporting object (e.g., a boat hull, not shown), an upper rotation guide 128, a lower rotatable joint 130 and an arm 132 rigidly connecting the upper rotation guide 128 to the lower rotatable joint 130. The lower rotatable joint 130 is fixed in relation to the socket 126. The socket 126 may be engageable with a complementing portion of an anchorage to an environmental supporting surface. As employed herein, the term complementing signifies that the complementing portion has structure configured to cooperate with and fulfilling the function of that item that it complements.

It should be understood that the lower rotatable joint 130 comprises a first rotatable joint member that is supported in relation to a lower end of the arm 132 and a second rotatable joint member that is supported in relation to the socket 126. The first and second rotatable joint members are operable to rotate in relation to one another.

The arm 132 spans from the lower rotatable joint 130 to the upper rotational guide 128, which cooperates with a body guide. As best seen in FIG. 1, the upper rotational guide 128 cooperates with the body guide 134 to collectively form an upper rotatable joint 136. The upper rotatable joint 136 also includes a screw 138 and a cap 140 having wings 142 to facilitate operation by finger pressure. Rotation of the body 104 relative to the mount 108 is about an axis 144. Rotation of the body 104 about the axis 144 enables elevation angle adjustment of the body 104 and of the fishing rod 102. A similar adjustment may be made using the lower rotatable joint 130 and its associated axis 146. The lower rotatable joint 130 may use fasteners similar to the screw 138 and the cap 140. Moreover, the upper and lower rotatable joints 136 and 130 may have internal interfitting teeth (shown but not referenced) to prevent rotation should their respective caps (e.g., cap 140) loosen. Rotational adjustment may be accomplished by loosening or unthreading the screw (e.g., screw 138) until the interfitting teeth disengage. The interfitting teeth prevent loss of positional adjustment due to minor loosening of the cap 140 and screw 138.

In general terms, the cap 142 and its associated components provide the first joint (e.g., the upper rotatable joint 136) with a locking mechanism operable to lock the first joint in a selected angular position.

The body guide 134 provides a first portion of a first rotatable joint (e.g., the upper rotatable joint 136). The first rotatable joint has the axis 144 of rotation, the latter not intersecting the longitudinal axis 110 of the body 104. The axis 144 of rotation of the first rotatable joint may be perpendicular to the longitudinal axis 110 of the body 104. The upper rotation guide 128 and its associated components provide a second complementing portion of the first rotatable joint. The socket 126 exemplifies the connector fixed to the second complementing portion of the first rotatable joint. The connector is configured to engage the anchorage, the latter fixed to an environmental surface supporting the rod holder 100.

The socket 126 may engage a base (not shown) attachable to a surface of the environmental supporting surface or object in a manner further detailed in Applicant's co-pending application, U.S. patent application Ser. No. 16/030,812, entitled "Accessory Mount for Environmental Surface", filed on Jul. 9, 2018, which claims priority to U.S. Provisional Patent Application No. 62/530,291 filed on Jul. 9, 2017, and U.S. Provisional Patent Application No. 65/585,222 filed on Nov. 13, 2017, the disclosures of which are incorporated herein by reference in their entirety.

Turning now to FIG. 4, the rod holder 109 comprises a slot 148 in a lower forward portion of the body 104, opposite the opening 116 of the body 104, that is open for insertion of a reel foot 150 of a spinning reel. To insert the fishing rod 102 into the trough 156, the collar 106 is rotated so that the collar opening 114 faces downward, coincident with the slot 148. This permits the fishing rod 102 to be inserted linearly into the trough 156, in a lengthwise direction from front to back, or along longitudinal axis 110 of the body 104, until the connecting arm 152 of the reel foot 150 engages a terminal end of the slot 148. After a connecting arm 152 of the reel foot 150 has been inserted into the slot 148, the collar 106 is rotated to cover the slot 148 (as show in FIG. 5). The collar 106 may be rotated so that the collar opening 114 is no longer coincident with the slot 148, trapping the foot and thus, the fishing rod 102 in the rod holder 102. The collar need only be rotated 90 degrees for a land 118 to engage a groove 120 to hold the collar 106 in position. The slot 148 enables the connecting arm 152 to protrude through the body 104. The slot 148 is sufficiently small so as to nearly immobilize the reel foot 150 and constrain the latter against rotation about the axis 110.

FIGS. 6-9 show a recess for accommodating a baitcaster or clutch structure of the fishing rod 102. This can be accomplished by rotating the collar 106 so that the collar opening 114 is facing upward, coincident with the opening 116 in the body 104. In this position, the fishing rod 102 may be inserted transversely into the trough 156. With the fishing rod 102 in the trough 156, the collar 106 may be rotated until the collar opening 114 is no longer coincident with the opening 116 in the body 104. This retains the fishing rod 102 in the rod holder 102. It should be noted that the collar need only be rotated 90 degrees for a land 118 to engage a groove 120 to hold the collar 106 in position. Baitcaster fishing rods have a hook keeper (shown but not referenced in FIG. 7), which extends downwardly from the fishing rod 102. To accommodate the hook keeper, the rod holder 100 has a relief (shown but not referenced in FIGS. 7-9) in a lower rear end of the body 104.

FIGS. 10-13 provide further views of the rod holder 100 and the fishing rod 102 held by the rod holder 100. In FIGS. 12 and 13, in particular, the fishing rod 102 is equipped with a fly fishing reel. To insert the fishing rod 102 into the trough 156, the collar 106 is rotated so that the collar opening 114 faces upward, coincident with the opening 116 in the body 104. This permits the fishing rod 102 to be inserted transversely into the trough 156. With the fishing rod 102 inserted into the trough 156, the collar 106 may be rotated so the that collar opening 114 is no longer coincident with the slot 148, trapping the fishing rod 102 in the rod holder 102. The collar need only be rotated 90 degrees for a land 118 to engage a groove 120 to hold the collar 106 in position.

As shown in FIGS. 10 and 11, a shoulder or recess 154 projects into the trough 156 or body 104, respectively, to form a relief in the side of the body 104 that is configured to engage and support the foot of the fly reel received within the trough 156. The wall of the body 104 about the recess 154 is also a thin wall because the fly reels are typically closely situated in relation to the spool of the reel.

Another feature stabilizing the fishing rod 102 within the trough 156 is shown throughout the drawings. Notably, the body 104 may include a proximal end 111 and an opposed distal end 113. The collar 106 may be located proximate the distal end 113 of the body 104. The proximal end 111 may include a control bar 115 encircling the trough 156 so that the fishing rod 102 received within the trough 156 is constrained against being removed laterally or transversely from the trough 156. As clearly shown in FIG. 14, the control bar 115 has a partial circular relief 160 in a forward portion thereof, and a general curved shape of the lower rear portion of the body 104 cooperates with the relief 160 to provide a substantially circular passage for the end of a fishing rod therethrough.

It should be appreciated that the invention described herein is an exemplary embodiment, and that the spirit and scope of the invention may be practiced in other forms. For example, the collar 106 could be arranged to occupy an interior of the body 104. The body 104 could be provided with a groove or recess to be occupied by the collar. Moreover, the trough 156 may comprise at least one relief 117 (as shown in FIG. 6) projecting into a side wall 119 of the trough 156. The relief 117 may be sized and configured to accommodate a laterally or transversely projecting element of a fishing reel or rod.

Although the invention has been described in terms of certain components being referred to in either the singular or the plural, other arrangements are possible. For example, it is to be understood that due to the conceptual description presented herein, components presented in the singular may be provided in the plural.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A fishing rod holder for holding alternatively different types of fishing rods with different types of fishing reels, the fishing rod holder comprising:
a body having a bottom defining an arcuate shaped trough along a length thereof, the body having a forward end defining a partially annular recess in an outer surface thereof and defining an upper opening in an upper portion of the body and a lower opening in a lower portion of the body, the lower opening extending rearwardly beyond the recess for receiving a support arm of a fishing reel, the body further having a rearward end having at least a partially circumferential control bar to hold a fishing rod against lateral or transverse movement in relation to the trough, an upper forward portion of the control bar having an arcuate shaped relief that aligns with an arcuate shaped relief in a rearward portion of the trough so as, together, cooperate to form a passage for an end of the fishing rod in an upright position, the body defining an upper open medial portion opposite the trough and between the recess and the control bar with a relief along opposing sides of the body juxtapose the control bar, the relief being partially defined by a linear shoulder dimensioned and configured to support a spool of a fly reel, the trough further comprising a relief therethrough proximate the rearward portion thereof dimensioned and configured to receive a hook keeper of a baitcaster to limit movement of the baitcaster in a longitudinal direction,
a collar having an opening therein and being supported for rotational movement in the partially annular recess selectively a position coincident with the first opening for passage of a rod portion therethrough, coincident with the second opening for passage of the fishing reel support arm therethrough, and between the first and second openings for closing the first and second openings to prohibit passage of the rod portion and the fishing reel support arm therethrough, and
a mount extending from beneath the trough configured to support the rod holder in relation to an environmental surface.

2. The rod holder of claim 1, wherein the collar is infinitely rotatable in relation to the body.

3. The rod holder of claim 1, wherein the collar is indexable in relation to the body.

4. The rod holder of claim 1, wherein the recess at least partially encircles the body, the recess being bounded between raised shoulder regions extending radially from the body, the recess being configured to receive the collar in close yet rotationally slidable cooperation therewith.

5. The rod holder of claim 4, wherein the collar engages the collar-engaging portion by a detent arrangement comprising one or more lands on one of the collar or the collar-engaging portion and one or more grooves on the other one of the collar-engaging portion or the collar, the one or more lands being engageable with the one or more grooves to provide one or more selectable positions for the collar in relation to the body.

6. The rod holder of claim 5, wherein the detent arrangement is configured to allow the collar to be selectively positioned with the collar opening facing upwards, downwards or at least one point therebetween.

7. The rod holder of claim 5, wherein the collar is configured of an elastic or slightly elastic material, which enables hand or finger pressure to overcome interaction of the one or more lands and the one or more grooves.

8. The rod holder of claim 1, wherein the holder is laterally symmetrical to accommodate left and right-handed users.

9. The rod holder of claim 1, wherein the relief is generally V-shaped.

10. The rod holder of claim 1, wherein the mount is an articulating mount.

11. The rod holder of claim 1, wherein the mount comprises a plurality of articulating joints.

12. The rod holder of claim 11, wherein each of the joints includes a locking mechanism operable to lock the joints in selected angular positions.

13. The rod holder of claim 5, wherein the one or more lands comprise two lands in the body, one on each opposing side of the body, and the one or more grooves comprise three grooves, circumferentially spaced about 90 degrees apart from one another, with two of the grooves circumferentially spaced about 90 degrees from a radial center of the collar opening and one of the grooves circumferentially spaced about 180 degrees from a circumferential center of the collar opening, wherein the lands and grooves allow the collar to be selectively positioned with the collar opening facing upwards, downwards or to the left or right sides of the body.

\* \* \* \* \*